United States Patent
Thomas et al.

(10) Patent No.: US 9,793,524 B2
(45) Date of Patent: Oct. 17, 2017

(54) WATER RESISTANT BATTERY BOX

(71) Applicant: Masco Corporation of Indiana, Indianpolis, IN (US)

(72) Inventors: Kurt Thomas, Indianapolis, IN (US); Derek Brown, Lizton, IN (US); Joel Sawaski, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 743 days.

(21) Appl. No.: 14/195,526

(22) Filed: Mar. 3, 2014

(65) Prior Publication Data
US 2014/0272509 A1 Sep. 18, 2014

Related U.S. Application Data

(60) Provisional application No. 61/799,250, filed on Mar. 15, 2013.

(51) Int. Cl.
*H01M 2/10* (2006.01)
*H01M 2/12* (2006.01)

(52) U.S. Cl.
CPC ......... *H01M 2/1027* (2013.01); *H01M 2/105* (2013.01); *H01M 2/1252* (2013.01)

(58) Field of Classification Search
CPC ... H01M 2/1027; H01M 2/105; H01M 2/1252
See application file for complete search history.

(56) References Cited

U.S. PATENT DOCUMENTS

| | | | | |
|---|---|---|---|---|
| 3,343,996 A | * | 9/1967 | Micksch | H01M 2/0439 220/613 |
| 5,003,440 A | * | 3/1991 | Maglica | F21L 4/005 362/158 |
| 5,611,517 A | | 3/1997 | Saadi et al. | |
| 5,842,777 A | * | 12/1998 | McDermott | F21L 4/005 362/157 |
| 5,988,588 A | | 11/1999 | Allen et al. | |
| 6,024,471 A | * | 2/2000 | McDermott | F21V 23/0414 362/205 |
| 6,025,086 A | | 2/2000 | Ching | |
| 6,273,394 B1 | | 8/2001 | Vincent et al. | |
| 6,962,168 B2 | | 11/2005 | McDaniel et al. | |
| 6,968,860 B1 | | 11/2005 | Haenlein et al. | |
| 7,625,667 B2 | | 12/2009 | Marty et al. | |
| 2005/0150556 A1 | | 7/2005 | Jonte | |
| 2005/0151101 A1 | | 7/2005 | McDaniel et al. | |
| 2005/0264258 A1 | * | 12/2005 | Yeh | H01M 2/105 320/112 |
| 2006/0245181 A1 | * | 11/2006 | Maglica | F21L 4/005 362/157 |
| 2013/0095439 A1 | * | 4/2013 | Putrello, Jr. | F23Q 7/02 431/258 |

* cited by examiner

*Primary Examiner* — Miriam Stagg
*Assistant Examiner* — Lilia V Nedialkova
(74) *Attorney, Agent, or Firm* — Faegre Baker Daniels LLP

(57) ABSTRACT

A water resistant battery box for use with electronic faucets. The battery box includes a lower housing, a cover supported by the lower housing, and an upper housing positioned between the lower housing and the cover. The upper housing includes a lip seal cooperating with the lower housing to prevent water from leaking into the housing while permitting for internal pressure within the battery box to be relieved.

17 Claims, 6 Drawing Sheets

WATER RESISTANT BATTERY BOX

CROSS-REFERENCE TO RELATED APPLICATION

This application claims priority to U.S. Provisional Patent Application Ser. No. 61/799,250, filed Mar. 15, 2013, the disclosure of which is expressly incorporated herein by reference.

BACKGROUND AND SUMMARY OF THE DISCLOSURE

The present invention relates generally to battery boxes and, more particularly, to a battery box adapted for use with a faucet.

Batteries are often required for the operation of electronic faucets. For accessibility and proximity to the faucet, batteries may be stored in a battery box within a sink cabinet. The inside of the cabinet is often a humid and wet environment. If cleaners and chemicals are stored within the cabinet, exposure of the battery box to corrosive chemical spills and fumes is also possible.

Commercially available battery boxes generally fall into two categories. There are relatively inexpensive open battery holders that act primarily to constrain the battery cells against electrical contacts. The batteries and the electrical contacts are exposed to ambient conditions with no protection. Other battery boxes may be hermetically sealed boxes including o-ring or gasket seals. These often have multiple seals to accommodate wires passing therethrough and may have vents to prevent the excessive build up of hydrogen gas from operation of the batteries.

Battery boxes typically accommodate a single size and number of cells. However, AA and C battery cells are approximately the same length and have the same voltages. Manufacturers often promote AA cell batteries because of their cost, but C cell batteries contain many times the energy and therefore extend the period between required battery replacement. It would be beneficial to have a battery box that can accommodate both AA and C cell batteries, allowing the customer to have a choice in replacement options.

In an illustrative embodiment of the present disclosure, a battery box includes a lower housing, a cover supported by the lower housing, and an upper housing positioned intermediate the lower housing and the cover. The upper housing illustratively includes a lip seal configured to engage an inner surface of the lower housing.

According to another illustrative embodiment of the present disclosure, a battery box includes a lower housing having an internal chamber configured to receive batteries, and an upper housing operably coupled to the lower housing. The upper housing includes a lip seal to engage an inner surface of the lower housing. The lip seal includes a v-shaped cross-section to facilitate sealing against external water and venting gas pressure from within the lower housing.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

The detailed description of the drawings particularly refers to the accompanying figures in which.

DETAILED DESCRIPTION OF THE DRAWINGS

Figure 1:
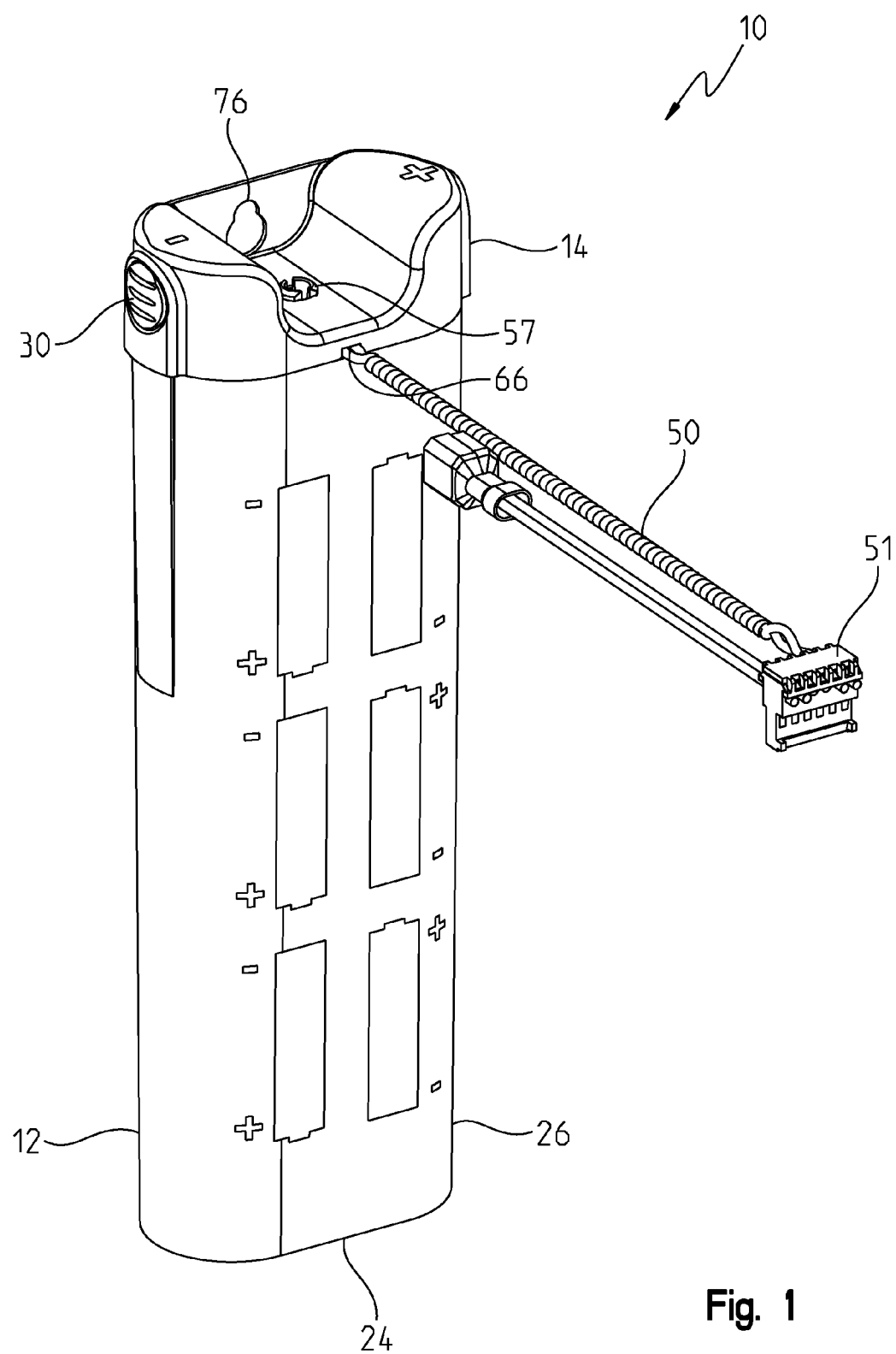
FIG. 1 is a perspective view of a battery box according to illustrative embodiment of the present disclosure.
Figure 2A:
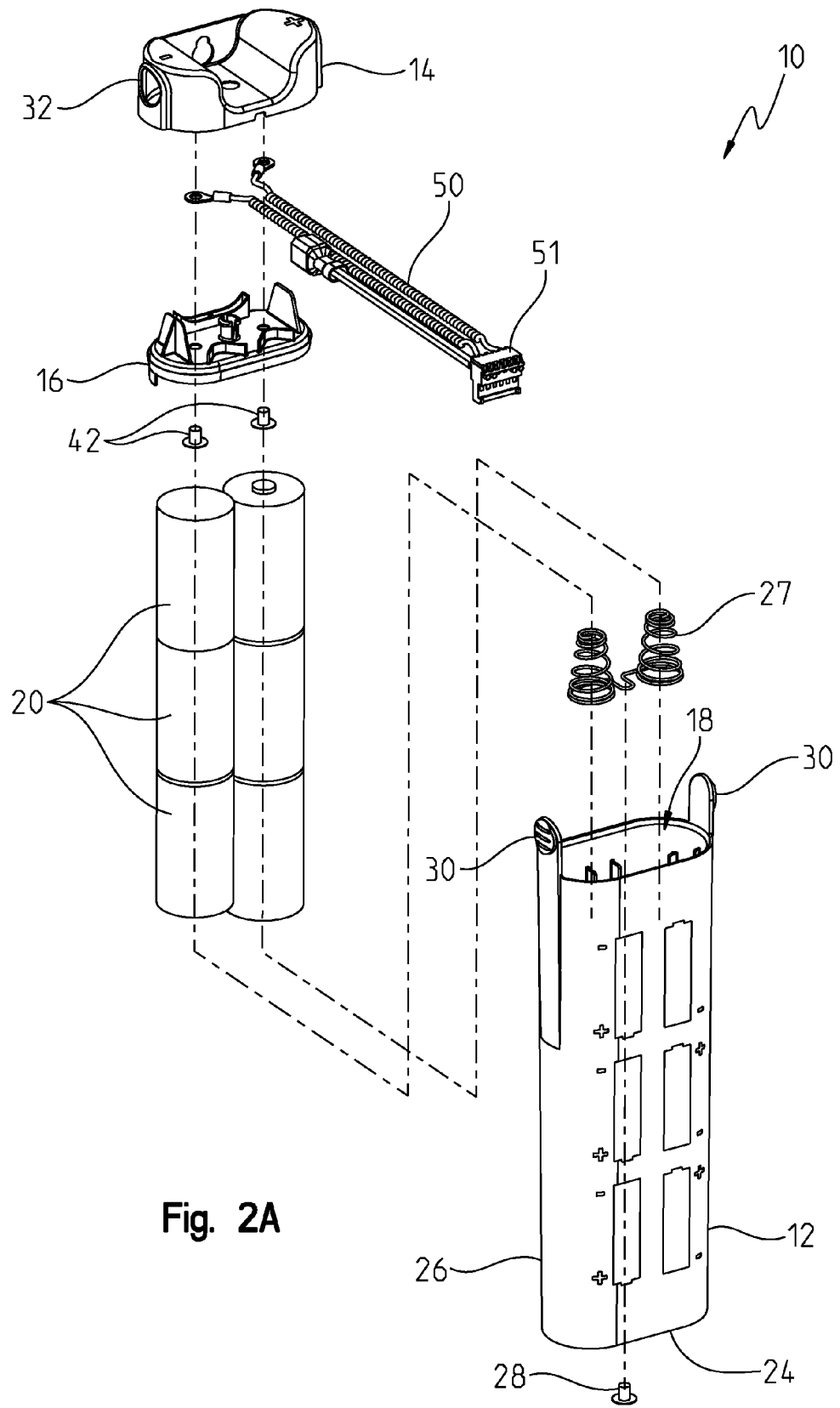
FIG. 2A is an exploded perspective view of the battery box of FIG. 1, having a first battery configuration.
Figure 2B:
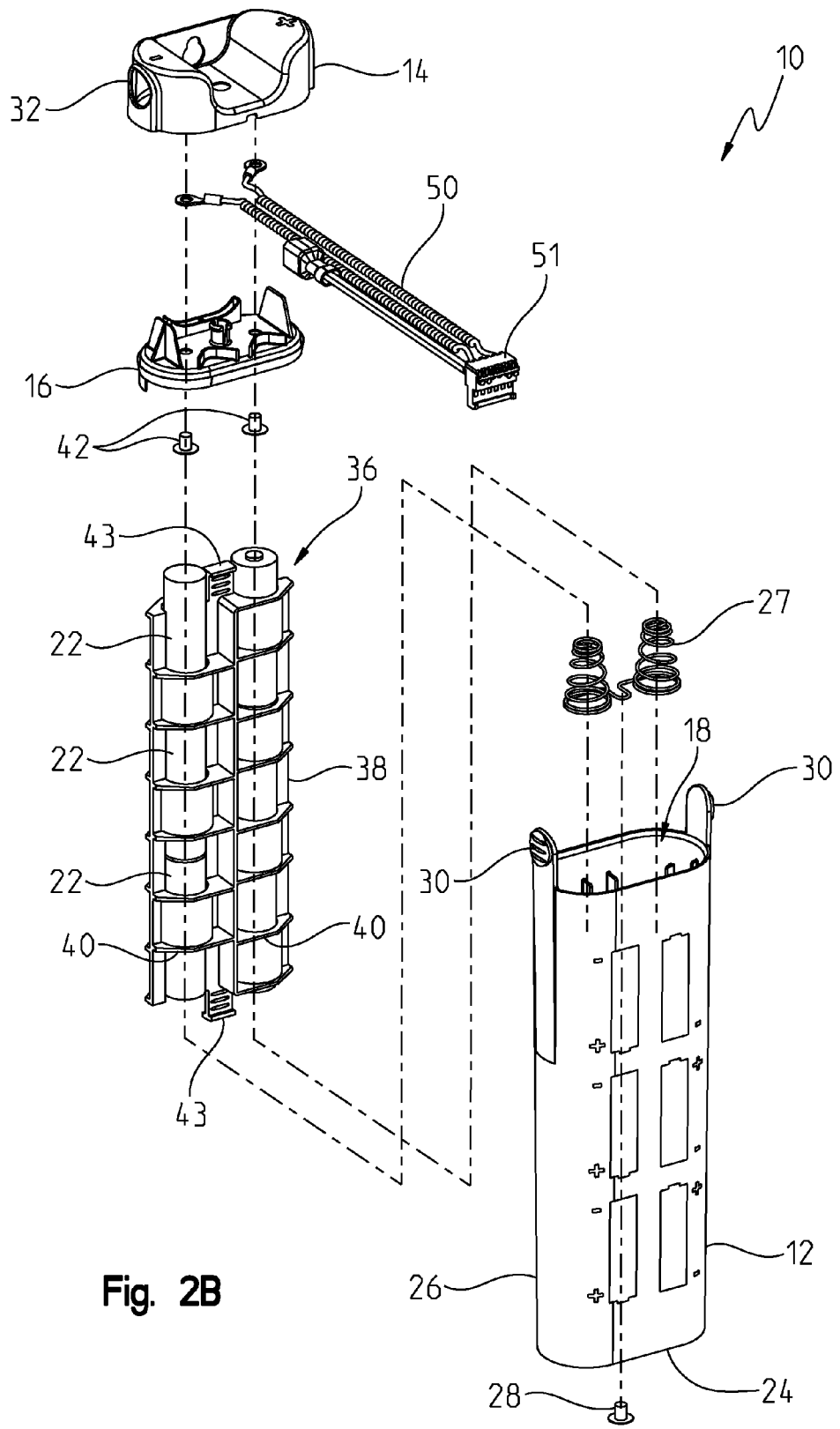
FIG. 2B is an exploded perspective view of the battery box of FIG. 1, having a second battery configuration.
Figure 3:
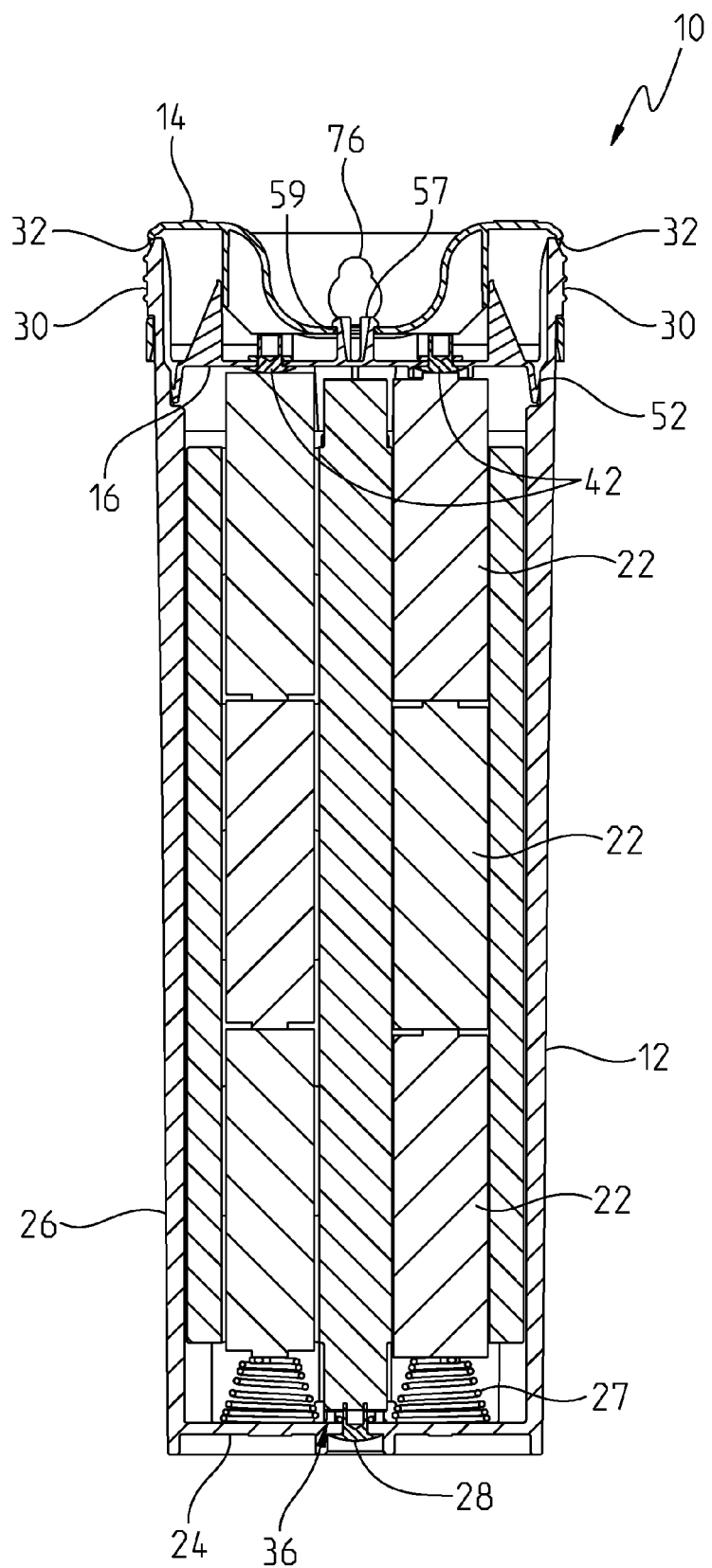
FIG. 3 is cross longitudinal cross-sectional view of the battery box of FIG. 1.

Referring initially to FIGS. 1-3, a battery box 10 of the present disclosure is illustrated as including a lower housing or holder 12, a cover 14, and an upper housing or lid 16 positioned intermediate the cover 14 and the lower housing 12. The lower housing 12 defines an internal chamber 18 illustratively sized to receive two 3 cell groups of C-cell batteries 20 (6 batteries total). As further detailed herein the housing 12 may also accommodate two 3 cell groups of AA-cell batteries 22 (6 batteries total).

The lower housing 12 illustratively includes a base or lower wall 24 and an upwardly extending side wall 26. The housing 12 is illustratively molded from a polymer, such as polypropylene. The cover 14 may similarly be molded from a polymer, such as polypropylene.

An electrical contact, illustratively a dual spring contact 27 is illustratively supported at the base 24 of the lower housing 12. The spring contact 27 may be secured to the base 24 of the lower housing 12 by a fastener, such as a rivet 28. An upper end of the lower housing 12 includes a pair of upwardly extending arms or tabs 30. The tabs 30 are configured to snap into openings 32 formed in the cover 14, thereby securing the cover 14 to the lower housing 12.

With reference to FIGS. 2B and 3, an adapter 36 may be supported within the housing 12 when it is desired to utilize AA cell batteries 22 instead of C cell batteries 20. The adapter 36 may be a single molded part formed from a polymer, such as polystyrene. The adapter 36 illustratively includes a support 38, including a plurality of transversely extending arms 40 to receive AA cell batteries. Finger grips or tabs 43 may be provided at opposing upper and lower ends of the support 38 to facilitate insertion and removal of the adapter 36 within the lower housing 12.

Figure 4:
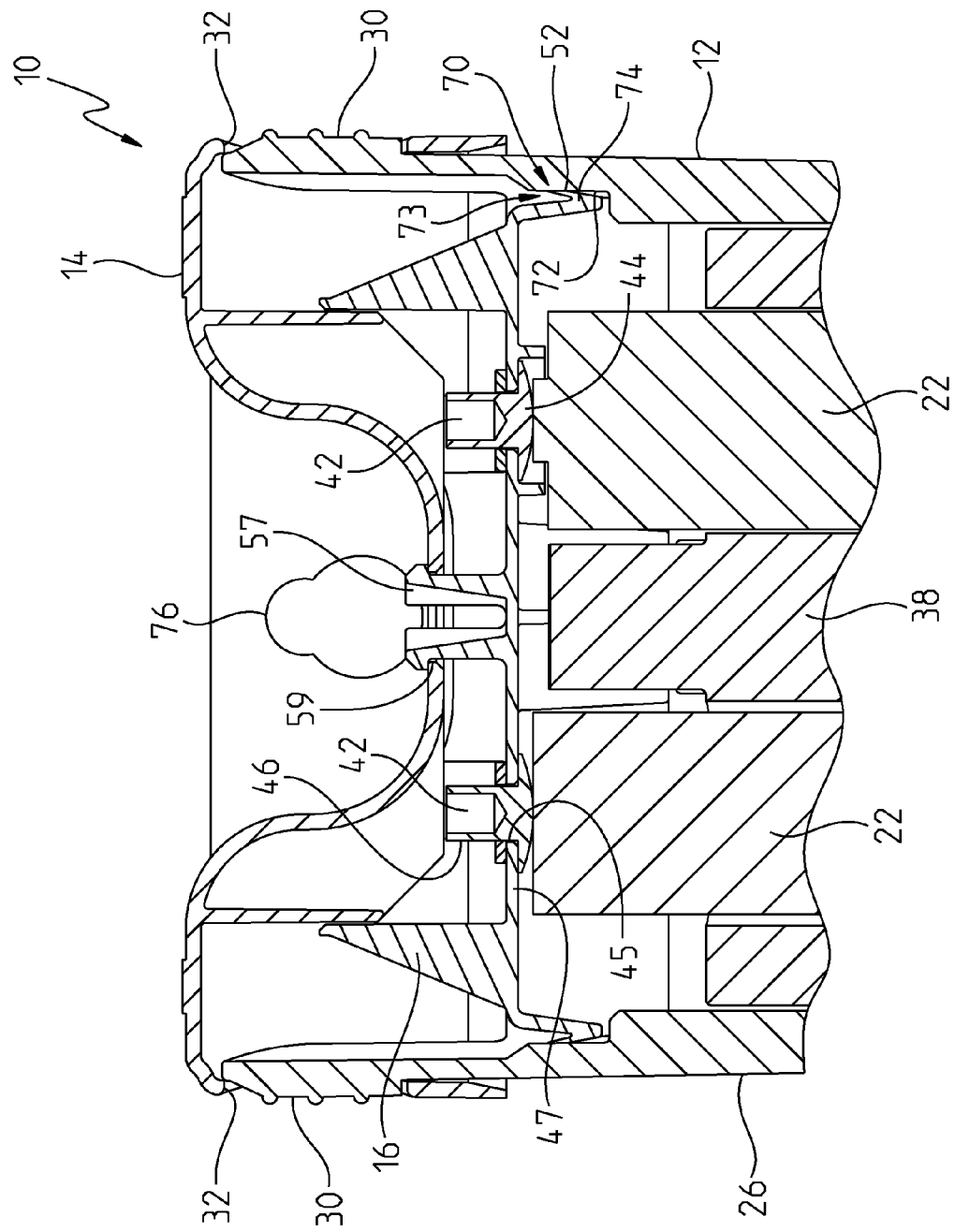
FIG. 4 is a detailed cross-sectional view of FIG. 3.
Figure 5:
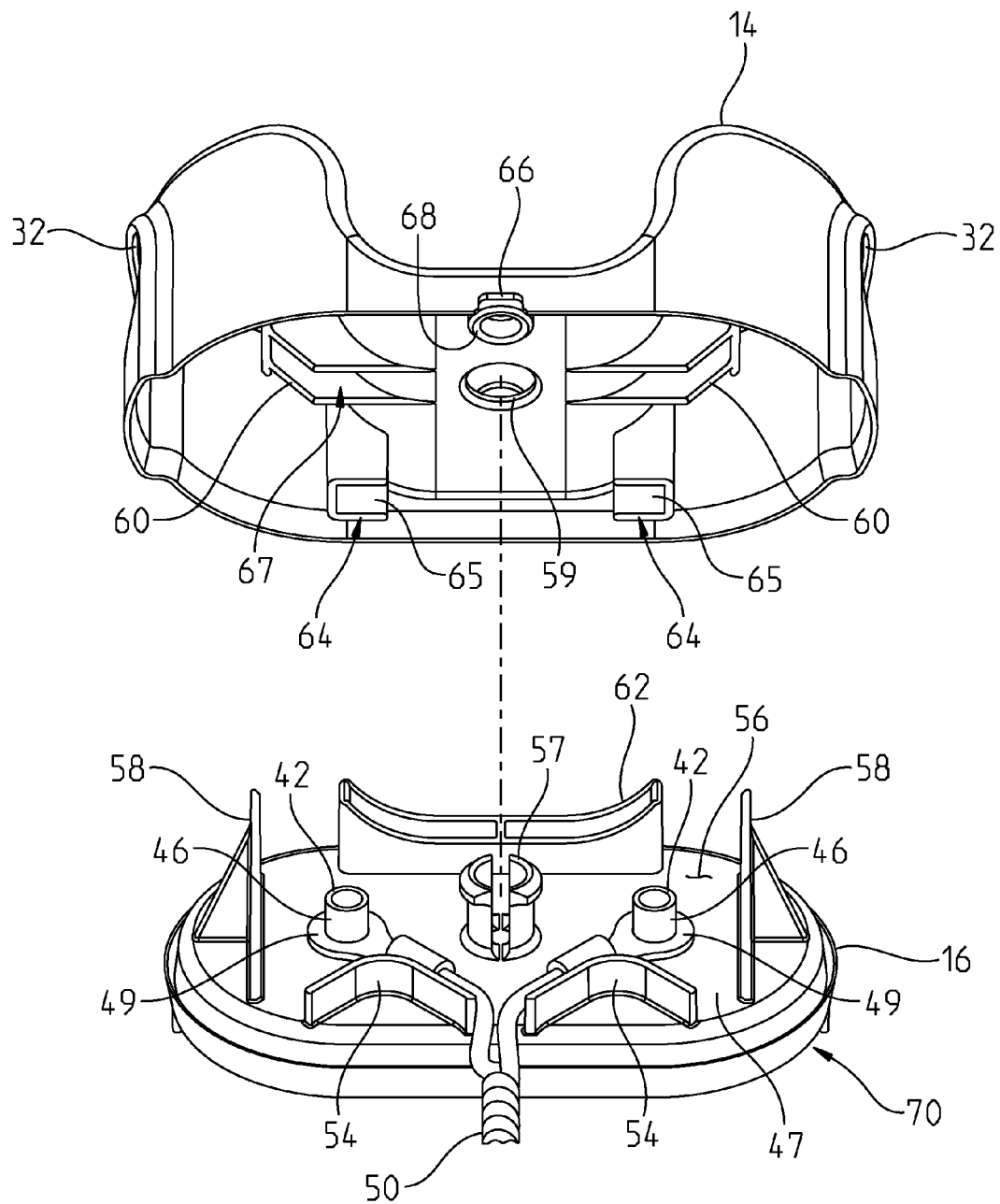
FIG. 5 is a detailed exploded perspective view illustrating interaction between the cover and the seal of the battery box of FIG. 1.

With reference to FIGS. 4 and 5, the upper housing 16 illustratively includes a pair of upper contacts 42 to provide electrical communication with the batteries 20, 22. The electrical contacts 42 are illustratively in the form of rivets, each formed of an electrically conductive material and including a button head 44 and a shaft 46 extending through openings 45 in a lower wall 47 of the upper battery housing 16. Ring terminals 49 of electrically conductive wires 50 are secured to the rivet shafts 46. The wires 50 extend outwardly from the battery box 10 to an electrical connector 51 for coupling with external electrical components of a faucet. The button head 44 of the rivet 42 contacts the end of the battery 20, 22, and the shaft 46 is crimped around ring terminal 49 on the outside of the upper housing 16. By forming rivets 42, the button head 44 and shaft 46 seal the openings 45 within the upper housing 16. The cover 14 is placed over the upper housing 16 to shield the rivets 42 and wire ends 49 from short circuit.

With further reference to FIGS. 4 and 5, the upper housing 16 is received within a recess 52 formed within the upper end of the lower housing 12. A pair of arcuate guides 54 are supported by the upper surface 56 of the upper housing 16 and are configured to help guide the wires 50 out of the upper housing 16. An integrally molded snap feature outside of the battery box 10 allows for a connection between the cover 14 and the upper housing 16. More particularly, the cover 14 is secured to the upper housing 16 through a releasable peg or snap 57 that is received within an aperture 59 within the cover 14.

In the illustrative embodiment, a pair of upwardly extending walls 58 on the upper housing 16 engage with downwardly extending walls 60 from the cover 14 to guide and provide for a secure fit. A locater 62 extends upwardly from the upper housing 16 and is received within openings 64 defined by c-shaped walls 65 extending downwardly from the cover 14. The shafts 46 of the rivets 42 are illustratively received an opening 67 formed within the cover 14.

Wires 50 pass from the terminals on the rivets 42 and pass through the guides 54 and out through an opening or notch 66 in the cover 14. An engagement post 68 illustratively engages and helps secure the wires 50 in place.

With reference to FIG. 4, a lip seal 70 is defined by the outer peripheral edge of the upper housing 16 and is configured to seal against an upper inner surface 72 of the lower housing 12. The lip seal 70 includes an upwardly facing V-shaped channel 73 (in cross section), such that a first leg 74 is pressed against the inner surface 72 as a result of water collecting within the channel 73. As such, the lip seal 70 helps seal against water entering the battery box 10. The seal 70 may also vent internal pressure from within the lower housing 12. More particularly, gas pressure within the internal chamber 18 causes first leg 74 to move away from inner surface 72 of lower housing 12, thereby providing a gas vent while still preventing water from entering the lower housing 12.

The upper housing 16 may be molded from a polymer, such as an acetal, such that the lip seal 70 is incorporated into the upper housing 16 for sealing against the lower housing 12. The lip seal 70 allows for a low cost sealing mechanism which is simple to mold. The seal 70 is easy to insert without lubrication. The asymmetric nature of the lip seal 70 provides the benefit of allowing the venting of hydrogen gas from inside battery box 10 while still preventing water from intruding into the batteries 20, 22.

A keyhole feature 76 is illustratively molded into the battery cover 14 to allow for hanging of the battery box 10 from a screw or nail (not shown) attached to a vertical surface.

The lip seal 70 provides sealing for the upper housing 16 and is molded along the parting line of the molding tool. The shape of the seal 70 allows for internal pressure inside of the battery box 10 to be relieved. The rivets 42 are semi tubular and the head 44 is of adequate size to contact the battery terminals. The rounded nature of the rivet head 44 allows for increased contact pressure on the battery terminal. The wire 50 is placed on the rivet shaft 46 on the exterior surface of the upper housing 16. The rivet 42 is formed over the wire terminal 49 with conventional rivet tooling. The shaft 46 is illustratively deformed (e.g., bulged outwardly) during the forming process, producing a seal between the rivet 42 and the upper housing 16.

Although the invention has been described in detail with reference to certain preferred embodiments, variations and modifications exist within the spirit and scope of the invention as described and defined in the following claims.

The invention claimed is:

1. A battery box comprising:
   a lower housing;
   a cover supported by the lower housing; and
   an upper housing positioned intermediate the lower housing and the cover, the upper housing including a lip seal to engage an inner surface of the lower housing;
   a lower electrical contact supported by a base of the lower housing;
   an upper electrical contact supported by the upper housing, the upper electrical contact extending through a lower wall of the upper housing;
   a terminal of an electrically conductive wire coupled to the upper electrical contact, the wire extending through an opening in the cover; and
   an adapter received within the lower housing and configured to receive a plurality of AA cell batteries, wherein the lower housing is configured to receive C cell batteries without the adapter;
   wherein the upper housing is formed of a polymer, and the lip seal is integrally formed with the upper housing.

2. The battery box of claim 1, wherein the lip seal includes a v-shaped cross-section to facilitate sealing against external water and venting gas pressure from within the lower housing.

3. The battery box of claim 1, wherein the upper electrical contact comprises a rivet including a button head facing batteries received within the lower housing and a shaft extending through the lower wall of the upper housing.

4. The battery box of claim 3, wherein the lower electrical contact comprises a dual spring contact.

5. A battery box comprising:
   a lower housing;
   a cover supported by the lower housing;
   an upper housing positioned intermediate the lower housing and the cover, the upper housing including a lip seal to engage an inner surface of the lower housing;
   a lower electrical contact supported by a base of the lower housing;
   an upper electrical contact supported by the upper housing, the upper electrical contact extending through a lower wall of the upper housing;
   a terminal of an electrically conductive wire coupled to the upper electrical contact, the wire extending through an opening in the cover; and
   an adapter received within the lower housing and configured to receive a plurality of AA cell batteries, wherein the lower housing is configured to receive C cell batteries without the adapter;
   wherein an upper end of the lower housing includes a pair of upwardly extending tabs configured to snap into openings formed in the cover, thereby securing the cover to the lower housing.

6. The battery box of claim 5, wherein the lip seal includes a v-shaped cross-section to facilitate sealing against external water and venting gas pressure from within the lower housing.

7. The battery box of claim 5, comprises a rivet including a button head facing batteries received within the lower housing and a shaft extending through the lower wall of the upper housing.

8. The battery box of claim 7, wherein the lower electrical contact comprises a dual spring contact.

9. A battery box comprising:
   a lower housing including an internal chamber configured to receive batteries;
   an upper housing operably coupled to the lower housing and including a lower wall having an opening, and a lip seal to engage an inner surface of the lower housing, wherein the lip seal includes a v-shaped cross-section to facilitate sealing against external water and venting gas pressure from within the lower housing;
a lower electrical contact supported by a base of the lower housing;
an upper electrical contact supported by the upper housing, the upper electrical contact comprising a rivet including a button head facing batteries received within the lower housing and a shaft extending through the opening in the lower wall of the upper housing, the button head and the shaft sealing the opening in the lower wall of the upper housing; and
a cover, the upper housing being positioned intermediate the lower housing and the cover;
wherein an upper end of the lower housing includes a pair of upwardly extending tabs configured to snap into openings formed in the cover, thereby securing the cover to the lower housing.

10. The battery box of claim 9, wherein the internal chamber of the lower housing is configured to receive C cell batteries.

11. The battery box of claim 10, further comprising an adapter received within the lower housing and configured to receive a plurality of AA cell batteries.

12. The battery box of claim 9, wherein the lower electrical contact comprises a dual spring contact.

13. A battery box comprising:
a lower housing including an internal chamber configured to receive batteries;
an upper housing operably coupled to the lower housing and including a lower wall having an opening, and a lip seal to engage an inner surface of the lower housing, wherein the lip seal includes a v-shaped cross-section to facilitate sealing against external water and venting gas pressure from within the lower housing;
a lower electrical contact supported by a base of the lower housing; and
an upper electrical contact supported by the upper housing, the upper electrical contact comprising a rivet including a button head facing batteries received within the lower housing and a shaft extending through the opening in the lower wall of the upper housing, the button head and the shaft sealing the opening in the lower wall of the upper housing;
wherein the upper housing is formed of a polymer, and the lip seal is integrally formed with the upper housing.

14. The battery box of claim 13, further comprising a cover, the upper housing being positioned intermediate the lower housing and the cover.

15. The battery box of claim 13, wherein the internal chamber of the lower housing is configured to receive C cell batteries.

16. The battery box of claim 15, further comprising an adapter received within the lower housing and configured to receive a plurality of AA cell batteries.

17. The battery box of claim 13, wherein the lower electrical contact comprises a dual spring contact.

* * * * *